US008107979B2

(12) United States Patent
Kim et al.

(10) Patent No.: US 8,107,979 B2
(45) Date of Patent: Jan. 31, 2012

(54) MOBILE TERMINAL FOR PERFORMING INSTANT MESSAGING SERVICE

(75) Inventors: Dong Ho Kim, Seoul (KR); Young Wan Lim, Seoul (KR); Il Won, Seoul (KR)

(73) Assignee: LG Electronics Inc., Seoul (KR)

( * ) Notice: Subject to any disclaimer, the term of this patent is extended or adjusted under 35 U.S.C. 154(b) by 474 days.

(21) Appl. No.: 12/348,474

(22) Filed: Jan. 5, 2009

(65) Prior Publication Data
US 2009/0247196 A1 Oct. 1, 2009

(30) Foreign Application Priority Data

Mar. 31, 2008 (KR) ........................ 10-2008-0029925

(51) Int. Cl.
*H04W 4/00* (2009.01)
(52) U.S. Cl. .................. 455/466; 455/412.1; 455/412.2; 455/414.1; 709/204; 709/206; 709/207
(58) Field of Classification Search ............... 455/412.1, 455/412.2, 414.1, 466, 566, 413; 709/205, 709/206, 224, 207, 239, 219, 223; 715/711, 715/754, 758, 738, 753
See application file for complete search history.

(56) References Cited

U.S. PATENT DOCUMENTS

| 7,826,830 | B1* | 11/2010 | Patel et al. ................. 455/414.1 |
| 7,877,697 | B2* | 1/2011 | Canfield et al. ............... 715/753 |
| 2006/0155813 | A1* | 7/2006 | Dietz et al. .................... 709/207 |
| 2007/0124386 | A1 | 5/2007 | Klassen |
| 2008/0092063 | A1* | 4/2008 | Canfield et al. ............... 715/753 |
| 2008/0168138 | A1* | 7/2008 | Simpson ....................... 709/204 |
| 2010/0056109 | A1* | 3/2010 | Wilson et al. ............... 455/412.1 |

FOREIGN PATENT DOCUMENTS

| CN | 101119329 | 2/2008 |
| EP | 1962473 | 8/2008 |
| WO | 2005072494 | 8/2005 |
| WO | 2006034933 | 4/2006 |

* cited by examiner

*Primary Examiner* — Jean Gelin
(74) *Attorney, Agent, or Firm* — Lee, Hong, Degerman, Kang & Waimey

(57) ABSTRACT

A method of executing an instant messaging service using a wireless terminal in a wireless communication system includes associating at least one user as a messenger group, activating messenger communication with a server, transmitting a messenger group status activation message to the server, receiving status data associated with the messenger group, and displaying information representing an updated status of the at least one user of the messenger group based on the status data.

18 Claims, 15 Drawing Sheets

Establishing IM service usable area — 151

1. School ☑
2. Home ☑
3. Company ☑
4. Subway ☐
5. Kangnam-ku ☐

OK | Next (a)

Establishing IM service usable area — 151

1. School (10 times/5 hours)
2. Subway (10 times/3 hours)
3. Kangnam-ku (5 times/2 hours)
4. Home (5 times/1 hour)

OK | Next (b)

FIG. 10

Establishing IM service usable time period — 151

1. 9:00~10:00 ☑
2. 10:00~11:00 ☐
3. 11:00~12:00 ☐

10. 18:00~19:00 ☑

OK | Next (a)

Establishing IM service usable time period — 151

1. 18:00~19:00 (10 times)
2. 13:00~14:00 (8 times)
3. 20:00~22:00 (7 times)

OK | Next (b)

(a)

(b)

(c)

(d)

MOBILE TERMINAL FOR PERFORMING INSTANT MESSAGING SERVICE

CROSS-REFERENCE TO RELATED APPLICATION

Pursuant to 35 U.S.C. §119(a), this application claims the benefit of earlier filing date and right of priority to Korean Application No. 10-2008-0029925 filed on Mar. 31, 2008, the contents of which are hereby incorporated by reference herein in their entirety.

FIELD OF THE INVENTION

The present invention relates to a mobile terminal and a method for performing an instant messaging service in the mobile terminal.

DESCRIPTION OF THE RELATED ART

A mobile terminal may be configured to perform various functions. Examples of such functions include data and voice communications, capturing images and video via a camera, recording audio, playing music files via a speaker system, and displaying images and video on a display. Some terminals may be configured as multimedia players and support game playing.

More recently, mobile terminals have been configured to receive broadcast and multicast signals which permit viewing of contents such as videos and television programs. Efforts are ongoing to support and increase the functionality of mobile terminals. Such efforts include software and hardware improvements, as well as changes and improvements in the structural components which form the mobile terminal.

In a conventional art, a mobile terminal implementing an instant messaging service starts an instant messaging service with a server when a user inputs logon information to the mobile terminal. The mobile terminal receives and outputs status information of the other party who agrees to perform data communication with the user of the mobile terminal through the instant messaging service. The server transmits the status information of the other party to the mobile terminal when the status information of the other party is generated or changed, or periodically regardless of whether the status information is changed or not.

Therefore, in the conventional art, the mobile terminal continues to receive and output the status information of the other party while the user is logged into the instant messaging service even if the application module for the instant messaging service is inactive. As a result, data load on a network increases, the power consumption of the mobile terminal increases, and the amount of data processing, such as data encoding and decoding, increases due to the transmission and reception of unnecessary status information regarding the other party.

SUMMARY OF THE INVENTION

According to an embodiment of the present invention, a method of executing an instant messaging service using a wireless terminal in a wireless communication system includes associating at least one user as a messenger group, activating messenger communication with a server, transmitting a messenger group status activation message to the server, receiving status data associated with the messenger group, and displaying information representing an updated status of the at least one user of the messenger group based on the status data. Preferably, the messenger group status activation message is transmitted to the server when the messenger window is activated. The wireless terminal may receive the status data periodically when it is determined that the messenger communication is in an active status.

According to an aspect of the present invention, the messenger communication is determined to be in the active status when the wireless terminal detects at least one of data transmission and reception using the instant messaging service, an active user interface for the instant messaging service, entry into an instant messaging service usable area, or entry into an instant messaging service usable time period. Preferably, the wireless terminal stops receiving the status data when it is determined that the messenger communication is in an inactive status. It is determined that the messenger communication is in the inactive status when application modules, which are not related to the instant messaging service, have been operated for more than a predetermined time.

The method may also include transmitting a messenger group status deactivation message to the server when it is determined that the messenger communication is in the inactive status. The messenger communication may be in the active status when the wireless terminal detects at least one of data transmission and reception using the instant messaging service, an active user interface for the instant messaging service, entry into an instant messaging service usable area, or entry into an instant messaging service usable time period when the application modules, which are not related to the instant messaging service, have been operated for more than the predetermined time. The method may further include transmitting a messenger group status deactivation message to the server when the messenger window is deactivated.

According to an embodiment of the present invention, a wireless terminal includes a wireless communication unit performing messenger communication with a server, a controller configured to associate at least one user as a messenger group; activate the messenger communication with the server; transmit a messenger group status activation message to the server; and receive status data associated with the messenger group, and a display displaying information representing an updated status of the at least one user of the messenger group based on the status data.

According to an embodiment of the present invention, a wireless terminal configured to execute an instant messaging service in a wireless communication system includes a wireless communication unit for performing instant messaging communication with a server, a controller configured to associate at least one user as a messenger group; activate the instant messaging communication with the server; transmit a messenger group status activation message to the server; and receive status data associated with the messenger group only when the messenger window is activated, and a display for displaying the activated messenger window and an updated status of the at least one user of the messenger group only when the messenger window is activated. The wireless terminal does not receive the status data associated with the messenger group if the messenger window is not activated and not displayed on the display even when the instant messaging communication with the server has been activated.

BRIEF DESCRIPTION OF THE DRAWINGS

The above and other features and advantages of the present invention will become more apparent by describing in detail preferred embodiments thereof with reference to the attached drawings.

FIG. 9 is a view of a display illustrating when it is determined that an application module for an instant messaging service is active in a mobile terminal according to an embodiment of the present invention.

FIG. 10 is a view of a display illustrating when it is determined that an application module for an instant messaging service is active in a mobile terminal according to an embodiment of the present invention.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
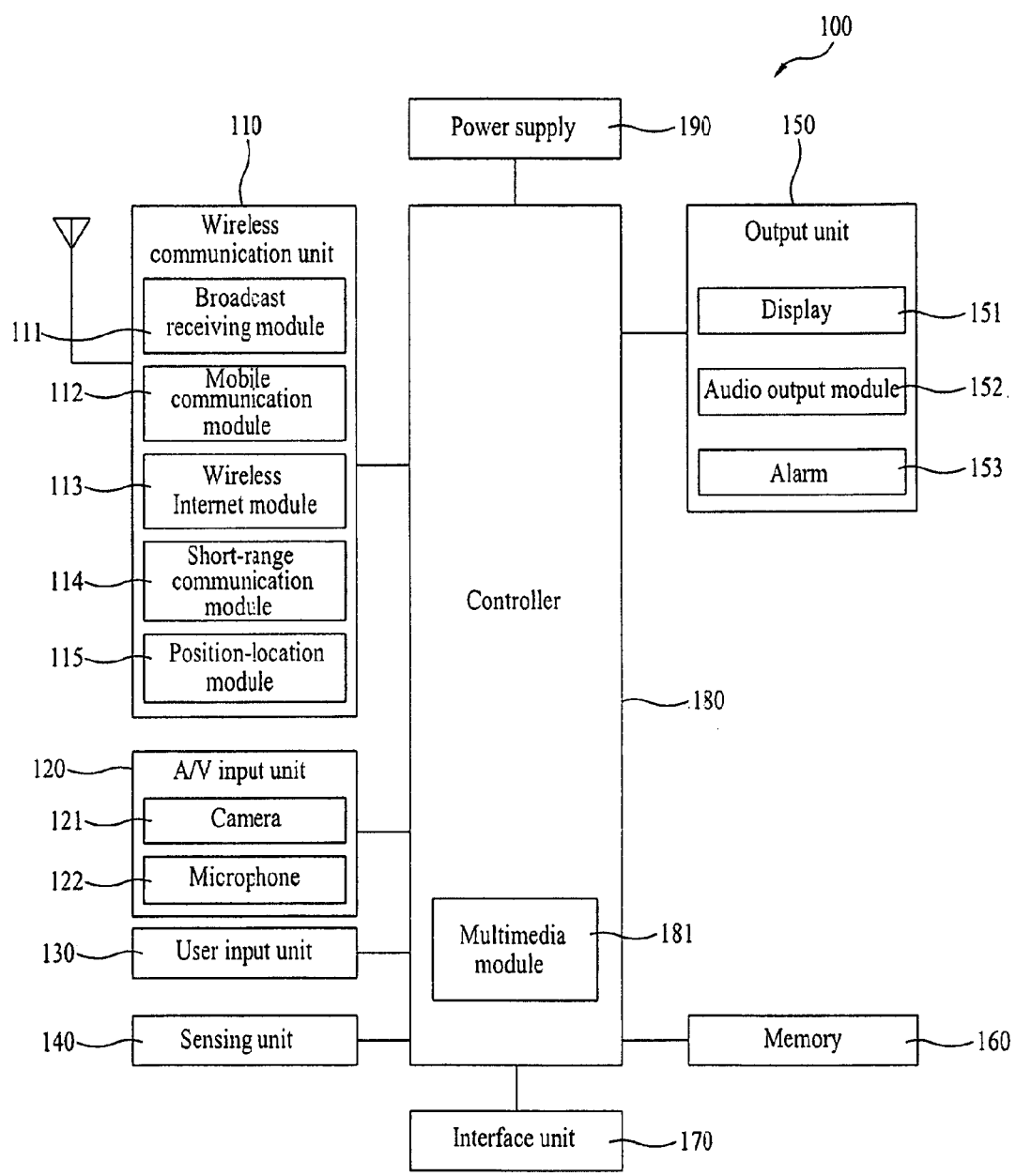
FIG. 1 is a block diagram of a mobile terminal according to an embodiment of the present invention.

FIG. 1 is a block diagram of mobile terminal 100 in accordance with an embodiment of the present invention. The mobile terminal 100 may be implemented using a variety of different types of mobile terminals. Examples of such mobile terminals include mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of mobile terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel or a terrestrial channel. The broadcast managing entity refers generally to a system which transmits a broadcast signal and/or broadcast associated information.

Examples of the broadcast associated information include information associated with a broadcast channel, a broadcast program, and a broadcast service provider. For example, the broadcast associated information may include an electronic program guide (EPG) of digital multimedia broadcasting (DMB) or an electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. Data received by the broadcast receiving module 111 may be stored in a suitable device, such as a memory 160.

The mobile communication module 112 communicates wireless signals with one or more network entities, such as a base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and HSDPA (High Speed Downlink Packet Access).

The short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as BLUETOOTH® and Zigbee®.

The position-location module 115 identifies or otherwise obtains the location of the mobile terminal 100. The position-location module 115 may be implemented using global positioning system (GPS) components which cooperate with associated satellites, network components, and combinations thereof.

The audio/video (A/V) input unit 120 is configured to provide audio or video signal input to the mobile terminal 100. As shown, the A/V input unit 120 includes a camera 121 and a microphone 122.

The camera 121 receives and processes image frames of still pictures or video. The microphone 122 receives an external audio signal while the portable device is in a particular mode, such as phone call mode, recording mode or voice recognition mode. This audio signal is processed and converted into digital data.

The mobile terminal 100 and specifically the A/V input unit 120, may include assorted noise removing algorithms to remove noise generated in the course of receiving the external audio signal. Data generated by the A/V input unit 120 may be stored in the memory 160, utilized by the output unit 150, or transmitted via one or more modules of the communication unit 110. If desired, two or more microphones 122 and/or cameras 121 may be used.

The user input unit 130 generates input data responsive to user manipulation of an associated input device or devices. Examples of such devices include a keypad, a dome switch, a touchpad such as a static pressure/capacitance, a jog wheel and a jog switch. A specific example is a user input unit 130 configured as a touchpad in cooperation with a touch screen display, which will be described in more detail below.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, or the orientation or acceleration/deceleration of the mobile terminal.

The sensing unit 140 may sense whether a sliding portion of the mobile terminal 100 is open or closed if the mobile terminal is configured as a slide-type mobile terminal. The sensing unit 140 may also sense the presence or absence of power provided by the power supply 190, and the presence or absence of a coupling or other connection between the interface unit 170 and an external device.

The interface unit 170 may be implemented to couple the mobile terminal 100 with external devices. Typical external devices include wired/wireless headphones, external chargers, power supplies, earphones, microphones and storage devices configured to store data such as audio, video, and pictures,. The interface unit 170 may be configured using a wired/wireless data port, audio input/output ports, video input/output ports, or a card socket for coupling to a memory card, a subscriber identity module (SIM) card, a user identity module (UIM) card, or a removable user identity module (RUIM) card).

The output unit 150 may include various components that support the output requirements of the mobile terminal 100. The display 151 may be implemented to visually display information associated with the mobile terminal 100. The display 151 may provide a user interface or graphical user interface that includes information associated with placing, conducting, and terminating a phone call if the mobile terminal 100 is operating in a phone call mode. As another example, the display 151 may additionally or alternatively display images associated with a video call mode or a photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152, which supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The output unit 150 is further shown having an alarm 153, which may signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration may be provided by the alarm 153 responsive to receiving user input at the mobile terminal 100 in order to provide a tactile feedback mechanism. It is understood that the various signals provided by the components of the output unit 150 may be separately performed, or performed using any combination of such components.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 shown in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage device.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals 100.

Figure 2:
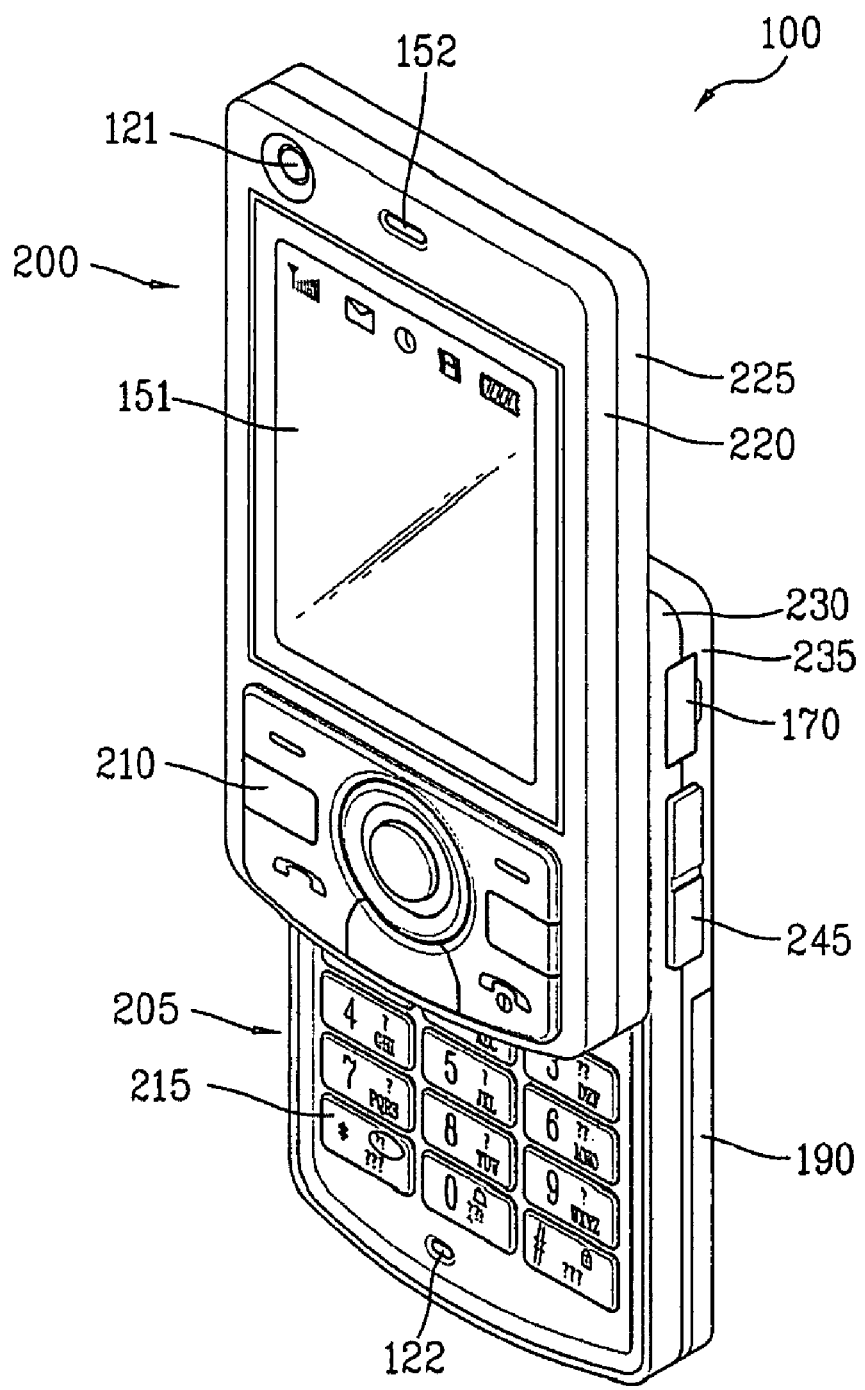
FIG. 2 is a perspective view of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 (described in FIG. 1) is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, and otherwise operate the mobile terminal 100.

The first body 200 slides relative to the second body 205 between open and closed positions. The first body 200 is positioned over the second body 205 in the closed position such that the keypad 215 is substantially or completely obscured by the first body. User access to the keypad 215, the display 151 and the function keys 210 is facilitated in the open position. The function keys 210 are conveniently configured for a user to enter commands, such as start, stop and scroll.

The mobile terminal 100 is operable in either a standby mode or an active call mode. The mobile terminal 100 is able to receive a call or message and to receive and respond to network control signaling in the standby mode.

The mobile terminal 100 typically operates in the standby mode in the closed position and in the active mode in the open position. This mode configuration may be changed as required or desired.

The first body 200 is shown formed of a first case 220 and a second case 225. The second body 205 is shown formed of a first case 230 and a second case 235. The first cases 220, 230 and second cases 205, 235 are usually formed of a suitably rigid material, such as injection molded plastic, or formed using metallic material, such as stainless steel (STS) or titanium (Ti).

One or more intermediate cases may be provided between the first case 225 and second case 225 of the first body 200 or between the first case 230 and second case 235 of the second body 205. The first body 200 and second body 205 are typically sized to receive electronic components necessary to support operation of the mobile terminal 100.

The first body 200 is shown having a camera 121 and audio output module 152, which is configured as a speaker, positioned relative to the display 151. The camera 121 may be constructed such that it can be selectively positioned relative to first body 200, such as by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of user input unit 130, positioned along the side of second body. Preferably, the side keys 245 are configured as hot keys, such that the side keys are associated with a particular function of the mobile terminal 100.

An interface unit 170 is shown positioned adjacent to the side keys 245. A power supply 190 in a form of a battery is shown located on a lower portion of the second body 205.

Figure 3:
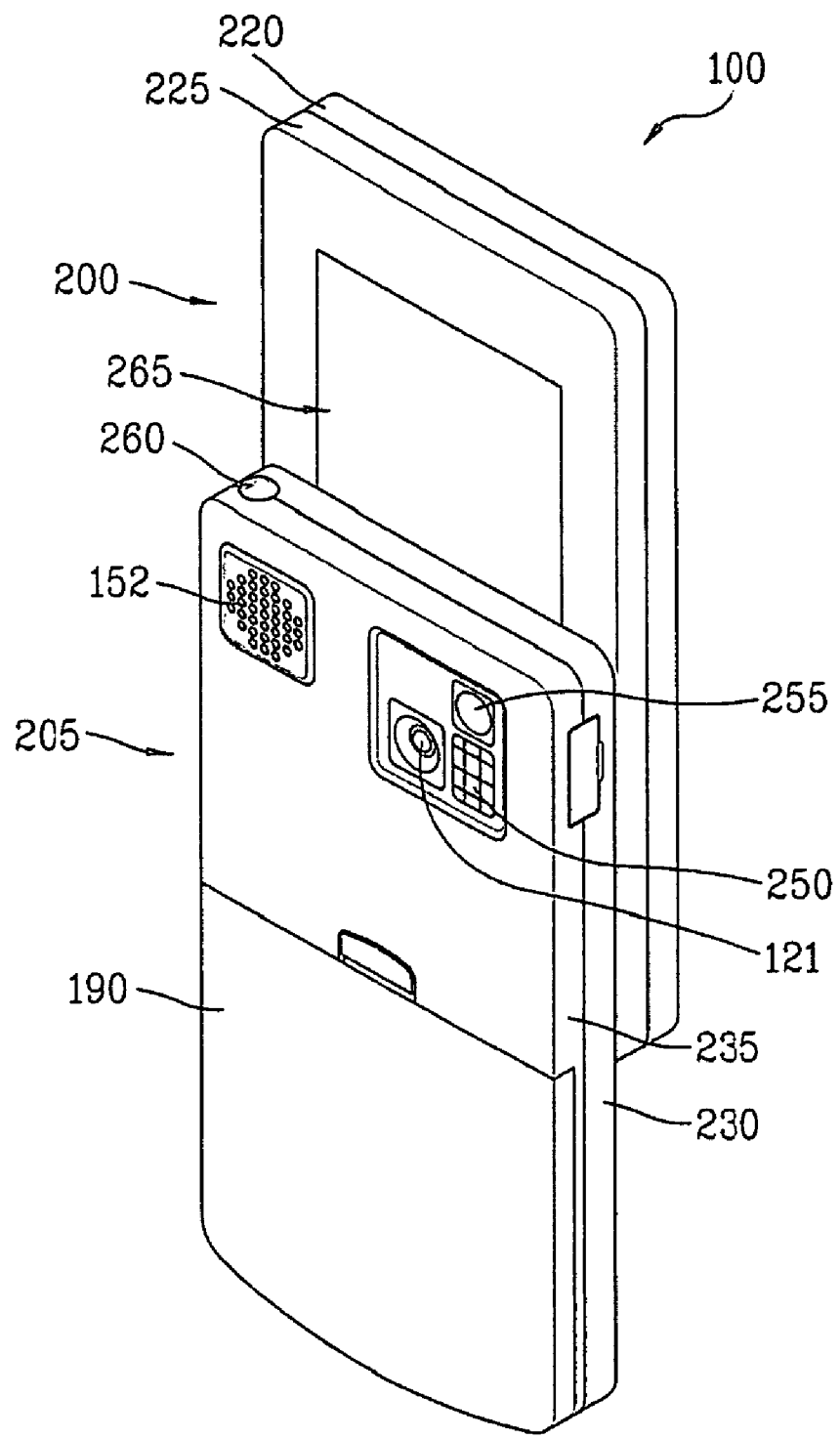
FIG. 3 is a rear view of the mobile terminal shown in FIG. 2.

FIG. 3 is a rear view of the mobile terminal shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 illustrated in FIG. 3 faces a direction opposite to a direction faced by the camera 121 of the first body 200 illustrated in FIG. 2. Each of the cameras 121 of the first body 200 and second body 205 may have the same or different capabilities.

The camera 121 of the first body 200 in one embodiment operates with a relatively lower resolution than the camera 121 of the second body 205. Such an arrangement works well during a video conference, for example, in which reverse link bandwidth capabilities may be limited. The relatively higher resolution of the camera 121 of the second body 205 is useful for obtaining higher quality pictures for later use or for communicating with other parties.

The second body 205 illustrated in FIG. 3 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205 in FIG. 3. The antenna 260 functions in cooperation with the broadcast receiving module 111 illustrated in FIG. 1. The antenna 260 may be fixed or retractable into the second body 205.

The rear side of the first body 200 includes a slide module 265. The slide module 265 slidably couples with a corresponding slide module located on the front side of the second body 205.

It is understood that the arrangement of the various components of the first body 200 and second body 205 illustrated in FIGS. 2 and 3 may be modified as required or desired. For example, some or all of the components of one body may be implemented in the other body. Further, the location and relative positioning of the components are not critical and, therefore, the components may be positioned at locations which differ from those shown in FIGS. 2 and 3.

The mobile terminal 100 of FIGS. 1-3 may be configured to operate within a communication system which transmits data via frames or packets, including both wireless and wired communication systems and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
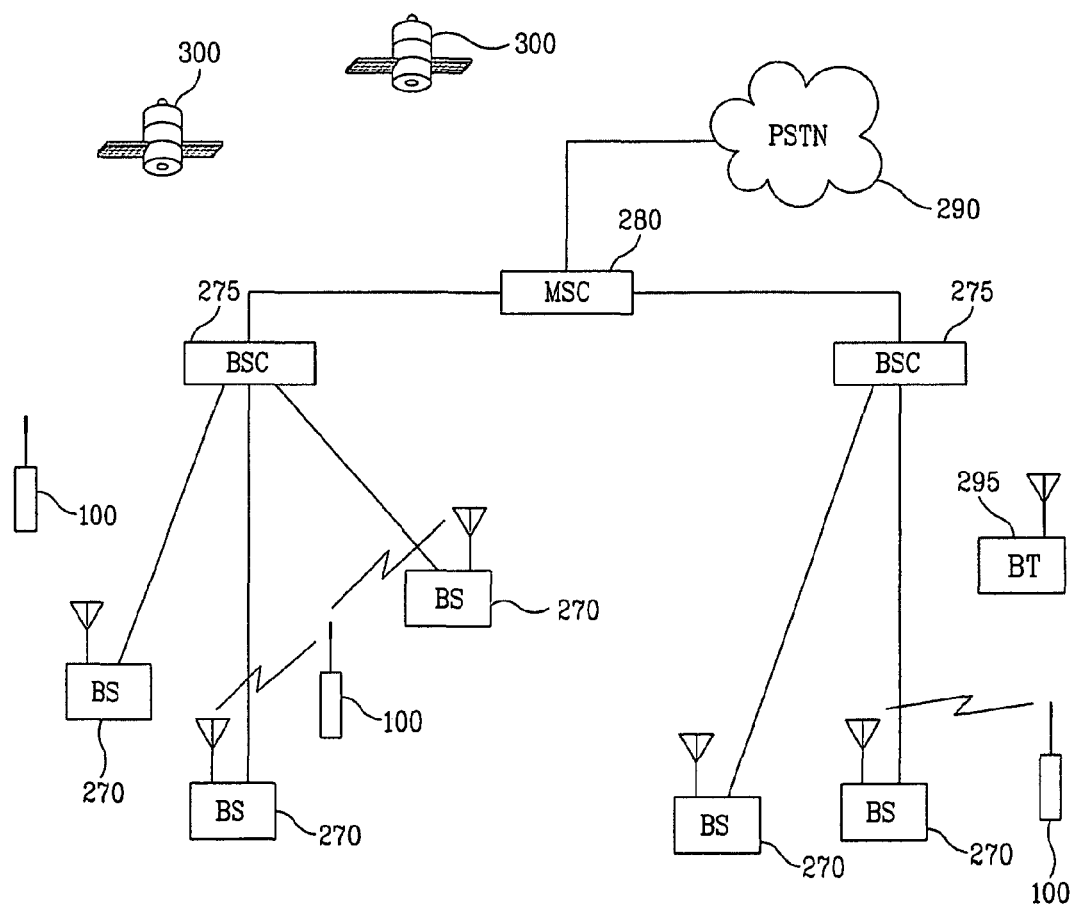
FIG. 4 is a block diagram of a CDMA wireless communication system operable with the mobile terminal of FIGS. 1 to 3.

Referring to FIG. 4, a CDMA wireless communication system is shown having a plurality of mobile terminals 100, a plurality of base stations (BS) 270, a plurality of base station controllers (BSC) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omni-directional antenna or an antenna pointed in a particular direction radially away from the base station. Alternatively, each sector may include two antennas for diversity reception. Each BS 270 may be configured to support a plurality of frequency assignments each having a particular spectrum, such as 1.25 MHz or 5 MHz.

The intersection of a sector and frequency assignment may be referred to as a CDMA channel. The BSs 270 may also be referred to as base station transceiver subsystems (BTSs).

The term "base station" may be used to refer collectively to a BSC 275 and one or more BSs 270. The BSs 270 may also be denoted as "cell sites." Alternatively, individual sectors of a given BS 270 may be referred to as "cell sites."

A terrestrial digital multimedia broadcasting (DMB) transmitter (BT) 295 is shown broadcasting to the mobile terminals 100 operating within the system. The broadcast receiving module 111 illustrated in FIG. 1 may be configured to receive broadcast signals transmitted by the BT 295. Similar arrangements may be implemented for other types of broadcast and multicast signaling as discussed above.

FIG. 4 further depicts several global positioning system (GPS) satellites 300 that facilitate locating the position of some or all of the mobile terminals 100. Two satellites 300 are depicted, but it is understood that useful positioning information may be obtained with greater or fewer satellites.

The position-location module 115 illustrated in FIG. 1 may be configured to cooperate with the satellites 300 to obtain desired position information. It is to be appreciated that other types of position detection technology may alternatively be implemented, such as location technology that may be used in addition to or instead of GPS location technology. If desired, some or all of the GPS satellites 300 may alternatively or additionally be configured to provide satellite DMB transmissions.

During typical operation of the wireless communication system, the BSs 270 receive sets of reverse-link signals from various mobile terminals 100. The mobile terminals 100 perform calls, messaging, and other communications.

Each reverse-link signal received by a given BS 270 is processed within that BS. The resulting data is forwarded to an associated BSC 275.

The BSC 275 provides call resource allocation and mobility management functionality including soft handoffs between the BSs 270. The BSCs 275 also route the received data to the MSC 280, which provides additional routing services for interfacing with the PSTN 290.

Similarly, the PSTN 290 interfaces with the MSC 280, which interfaces with the BSCs 275. The BSCs 275 control the BSs 270 to transmit sets of forward-link signals to the mobile terminals 100.

An instant messaging service related to the present invention includes services such as text communication, voice communication, image communication, and data communication. The data communication may be file transmission and reception in real time based on Internet protocol between a plurality of mobile terminals having an instant messaging service function. The instant messaging service may also include a mobile instant messaging service supporting an instant messaging service between mobile terminals.

Status information of the other party referred to in the present invention includes information regarding the current status of a user (hereinafter, referred to as 'the other party') of a mobile terminal that performs an instant messaging service. The status information of the other party may include a status such as on-line, off-line, out of office, meeting, or eating.

Figure 5:
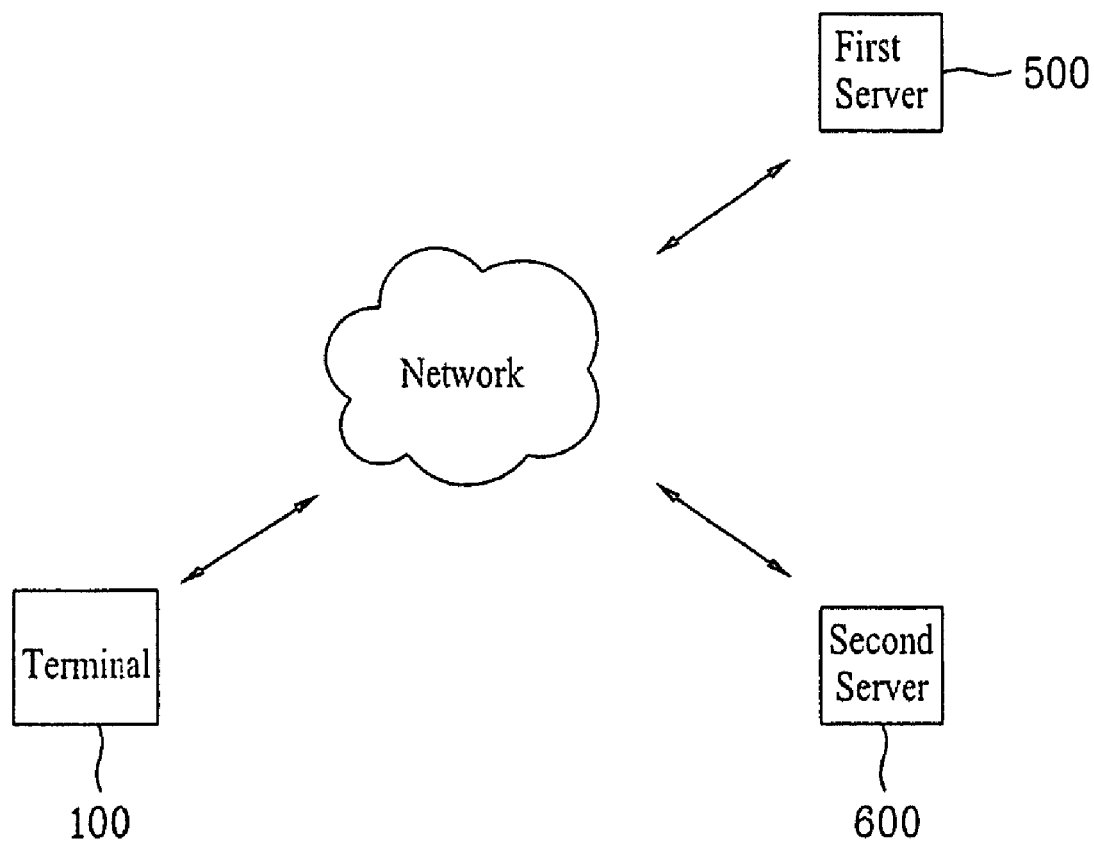
FIG. 5 illustrates a system for performing an instant messaging service according to an embodiment of the present invention.

Hereinafter, a method of performing an instant messaging service in a mobile terminal according to the present invention will be described referring to FIGS. 5 and 6. Referring to FIG. 5, a mobile terminal 100 transmits and receives a message or data to or from first and second servers 500 and 600 to implement an instant messaging service. For example, the first server 500 may be a server that monitors status information of a mobile terminal implementing an instant messaging service. The second server 600 may be a server that performs an instant messaging service. Depending on system requirements, the first and second servers 500 and 600 may be configured as an integrated structure or separate structures.

For example, when the first and second servers 500 and 600 are configured as separate structures, the mobile terminal 100 may perform an operation related to reception of status information of the other party with the first server 500. In the following description, a server is assumed to be the first server 500.

The mobile terminal 100 starts to perform an instant messaging service with the server 500. The server 500 may be a server that performs the instant messaging service. Alternatively, the server 500 may also include a server that monitors status information of a mobile terminal implementing the instant messaging service.

Figure 6:
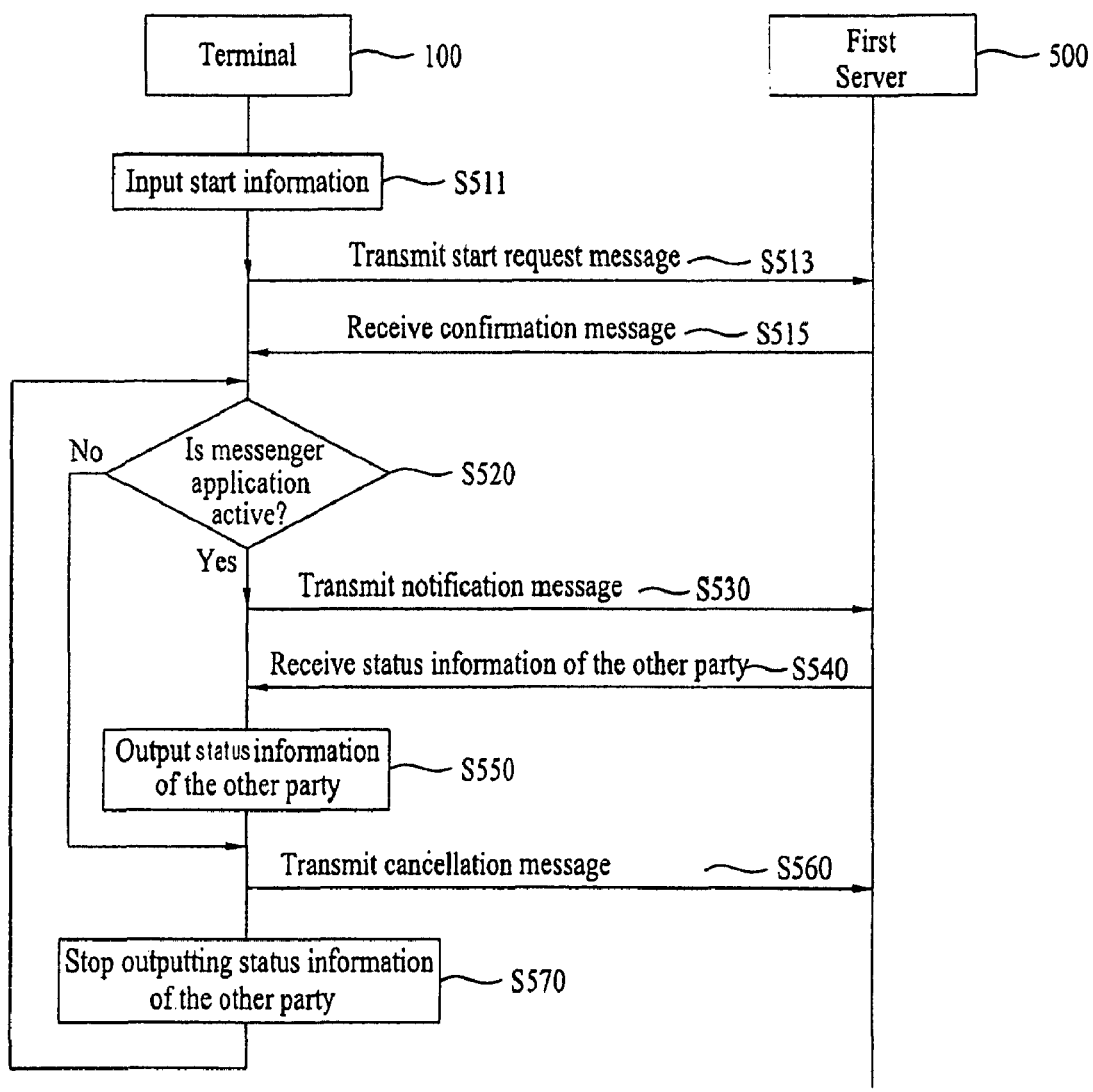
FIG. 6 is a flow chart illustrating a method of performing an instant messaging service in a mobile terminal according to an embodiment of the present invention.

Referring to FIG. 6, a user of the mobile terminal 100 inputs start information or logon information to the mobile terminal through a user input unit 130 (S511). When the user inputs the start information to the mobile terminal 100, the mobile terminal transmits a start request message to the server 500 through the wireless communication unit 110, specifically, the wireless internet module 113 to initiate the instant messaging service (S513).

The start request message includes information for authorizing the user of the mobile terminal 100 to use the instant messaging service. For example, the start request message includes verification information such as identification (ID), password, authentication information, or mobile terminal identification information which is input at step S511.

The mobile terminal 100 receives a confirmation message authorizing the mobile terminal for the use of the instant messaging service from the server 500 through the wireless communication unit 110 (S515). As described above, initiation of the instant messaging service between the mobile terminal 100 and the server 500 includes the input step (S511), the transmission step (S513), and the reception step (S515).

When initiating the instant messaging service, the mobile terminal 100 determines whether an application module for the instant messaging service is active (S520). The determination step (S520) may be performed by the controller 180.

For example, the controller 180 determines whether at least one or more of data transmission or reception using the instant messaging service are present, whether a user interface for the instant messaging service is active, whether the terminal entered into an area where the instant messaging service is usable, whether the terminal entered a time period in which the instant messaging service is usable, or whether other types of application modules, which are not related to the instant messaging, are being operated. The terminal 100 may also determine how long the other types of application modules have been operated. Preferably, the terminal 100 establishes a status of the instant messaging service according to criteria specified by the user of the terminal.

Figure 7:
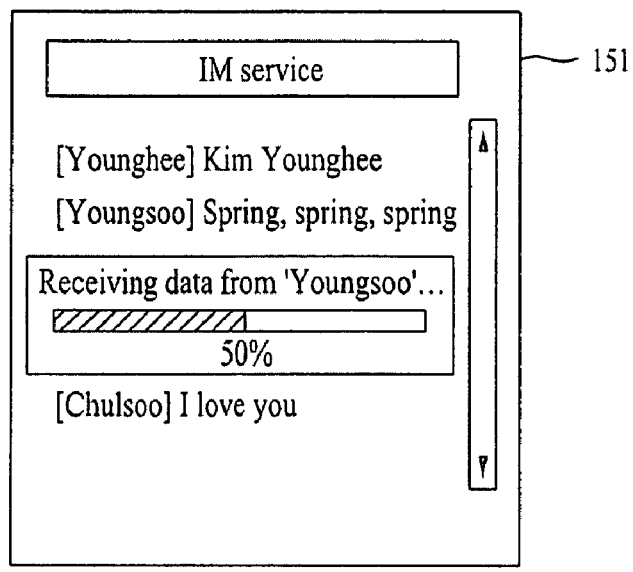
FIG. 7 is a view of a display illustrating when it is determined that an application module for an instant messaging service is active in a mobile terminal according to an embodiment of the present invention.
Figure 7:
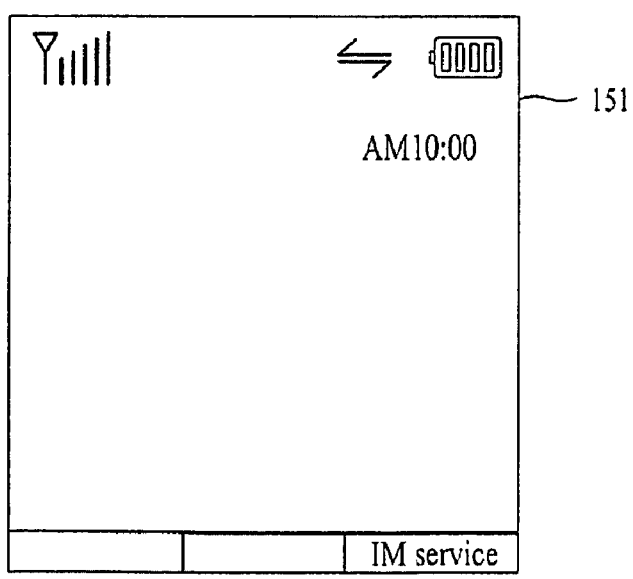

Referring to FIG. 7, the terminal 100 transmits and receives data to and from terminals of other parties using the instant messaging service. For example, if data are transmitted and received when an instant messaging service window or a user interface is activated, as shown in FIG. 7(a) or if data is transmitted and received when the instant messaging service window is not activated, as shown in FIG. 7(b), the terminal 100 determines that an application module for the instant messaging service is active.

The transmitted and received data preferably include various types of data, such as file type data, text data, voice data, image data, or video data. The mobile terminal 100 determines whether there were any previous data transmission and reception and whether there are any currently ongoing data transmission and reception using the instant messaging service. If there was any previous data transmission or reception performed recently within a predetermined time, even if the data transmission and reception are not currently being performed, the mobile terminal 100 may determine that the application module for the instant messaging service is active.

Figure 8:
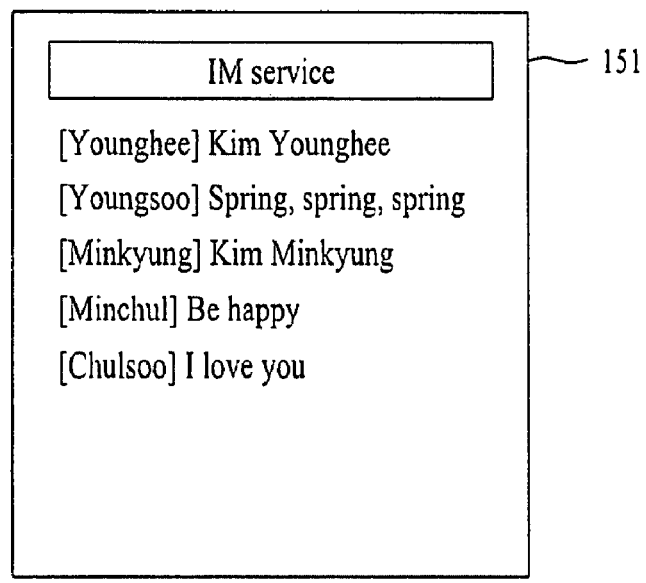
FIG. 8 is a view of a display illustrating when it is determined that an application module for an instant messaging service is active in a mobile terminal according to an embodiment of the present invention.
Figure 8:
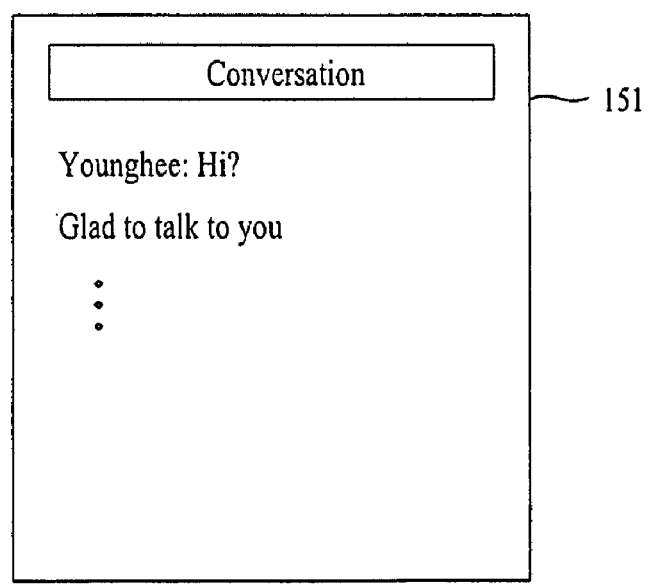

Referring to FIG. 8, if the user interface for the instant messaging service has been activated, the mobile terminal 100 determines that the application module for the instant messaging service is active. For example, when a list of the other parties who agreed to perform data communication with the user of the mobile terminal 100 through the instant messaging service is displayed on the screen, as shown in FIG. 8(a) or when the user of the mobile terminal is communicating with any one of the other parties via the instant messaging service, as shown in FIG. 8(b), the mobile terminal determines that the user interface for the instant messaging service has been activated. Consequently, the mobile terminal 100 determines that the application module for the instant messaging service is active.

Actions for activating the user interface may include displaying the window or screen for the instant messaging service, inputting messages, and performing an operation requiring the screen display for the instant messaging service. The mobile terminal 100 may confirm the active status of the instant messaging service by recognizing that the user interface for the instant messaging service has been activated recently within a predetermined time and the user interface for the instant messaging service is currently active.

Referring to FIG. 9(a), the mobile terminal 100 determines that an application module for the instant messaging service is active when an instant messaging service usable area is established. For example, when establishing the instant messaging service usable area, the user of the mobile terminal 100 may directly input an address, for example, a city, a county, or a state. The user may also select an address from an address list by selecting a name assigned to a specific address, for example, school, home, and company, selecting a point of interest (POI) assigned to the specific address, or selecting an area corresponding to a specific point using a map image. Alternatively, the user of the mobile terminal 100 may input information regarding a street within a predetermined radius from a specific area when selecting the specific area.

Alternatively, the mobile terminal 100 may arbitrarily establish an instant messaging service usable area according to usage frequency and/or duration of the instant messaging service performed in each area as shown in FIG. 9(b). Accordingly, if it is determined that the mobile terminal 100 is located at one of the areas established as the instant messaging service usable area by the position-location module 115, the mobile terminal determines that the application module for the instant messaging service is active.

Referring to FIG. 10, the mobile terminal 100 determines whether an application module for the instant messaging service is active based on whether it is a time period in which an instant messaging service may be used. According to the user's selection, the mobile terminal 100 may establish an instant messaging service usable time period as shown in FIG. 10(a). For example, when establishing the instant messaging service usable time period, the user of the mobile terminal 100 may directly input a time period or select a time period from a time period list.

Alternatively, the mobile terminal 100 may arbitrarily establish an instant messaging service usable time period according to the usage frequency and/or duration of the instant messaging service for each time period as shown in FIG. 10(b). Further, the time period may be arbitrarily established or changed by the user of the mobile terminal 100 or by the mobile terminal.

The mobile terminal 100 has a clock installed therein to determine the present time. Accordingly, if it is determined that the present time is included in the instant messaging service usable time period by the controller 180, the mobile terminal 100 determines that an application module for the instant messaging service is active.

Figure 11:
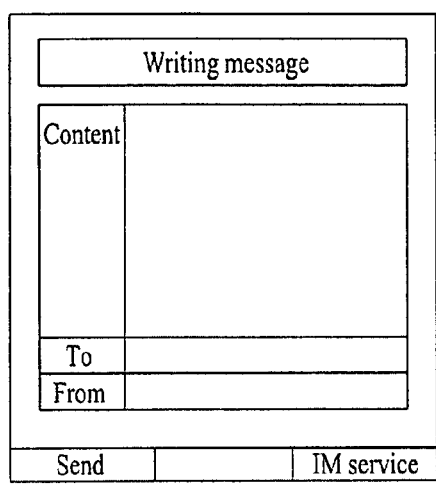
FIG. 11 is a view of a display illustrating when it is determined that an application module for an instant messaging service is active in a mobile terminal according to an embodiment of the present invention.
Figure 11:
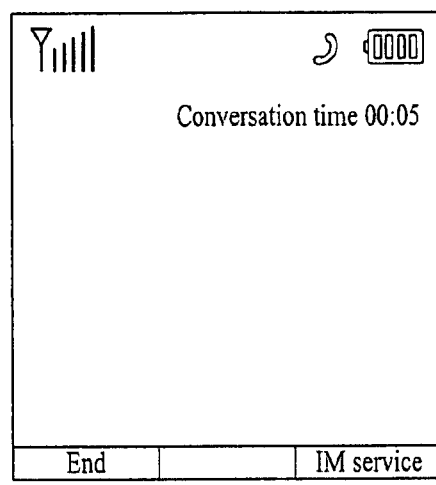
Figure 11:
Figure 11:
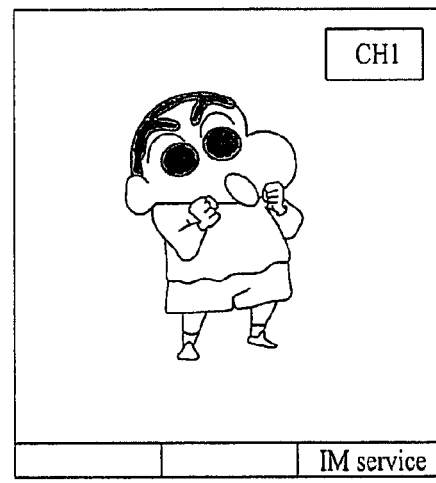

Referring to FIG. 11, the mobile terminal 100 determines whether an application module for the instant messaging service is active based on whether other types of application modules are being executed and/or how long the other types of application modules have been executed. Other types of application modules may include modules supporting other operations or services excluding the instant messaging service. For example, other types of application modules may include a module for messaging, a module for image/voice conversation, and a module for broadcast.

In particular, other types of application modules may include modules that perform Internet protocol based wireless data transmission and reception functions. For example, other types of application modules may include a module for image conversation, a module for video sharing, a module for broadcast signal sharing, and a module for network game.

The mobile terminal 100 determines that an application module for the instant messaging service is inactive when a message writing or input window is displayed by a module for messaging as shown in FIG. 11(*a*), a voice conversation is performed by a module for voice conversation as shown in FIG. 11(*b*), an image conversation is performed by a module for image conversation as shown in FIG. 11(*c*), or a broadcast is output by a module for broadcast as shown in FIG. 11(*d*).

The mobile terminal 100 may confirm duration of other types of application modules performed within a predetermined time and other types of application modules currently being executed. If the duration of the previously performed other types of application modules does not exceed the predetermined time, even if the other types of application modules are currently being executed, the mobile terminal 100 may determine that the application module for the instant messaging service is active. Other types of application modules may include modules which are physically different from the module for the instant messaging service.

Referring back to FIG. 6, if it is determined that an application module for the instant messaging service is active at step S520, the mobile terminal 100 transmits a notification message to the server 500 through the wireless communication unit 110, specifically, the wireless internet module 113 to request status information of the other party (S530). This step is referred to as the transmission step (S530).

Before the transmission step (S530), the user of the mobile terminal 100 may designate at least one 'designation information' from a party to be notified, a status to be notified, or a period to be notified. Therefore, at the transmission step (S530), the mobile terminal 100 may transmit a notification message including the designation information to the server 500.

Consequently, when the server 500 receives the notification message from the mobile terminal 100, the server registers the terminal as a notification target terminal to inform status information of the other party. Furthermore, when the server 500 receives a notification message including the designation information, the server also registers the designation information when registering the mobile terminal 100 as the notification target terminal to inform the status information of the other party.

Figure 12A:
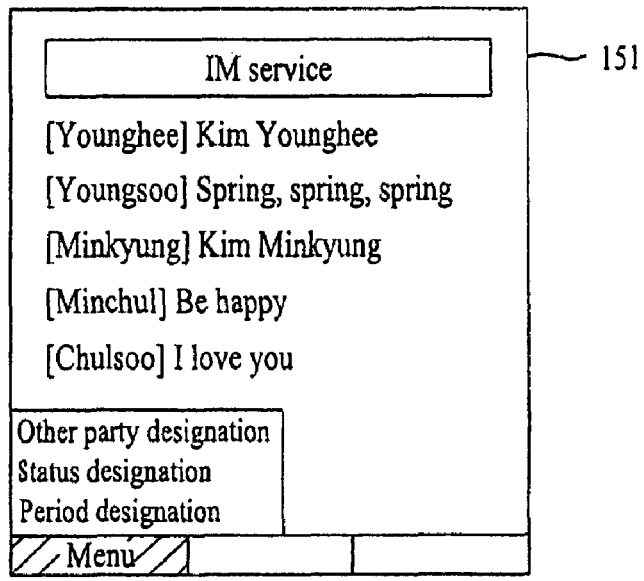
FIGS. 12A to 12D illustrate display screens for specifying criteria for grouping status information of the other party in a mobile terminal according to an embodiment of the present invention.

A process for establishing the designation information will be described hereinafter in more detail with reference to FIGS. 12A to 12D. As shown in FIG. 12A, when the user of the mobile terminal 100 selects "Menu" disposed at a portion of an instant messaging service execution screen, the mobile terminal displays a designation target list. For example, the designation target list includes "Other party designation," "Status designation," and "Period designation."

Figure 12B:
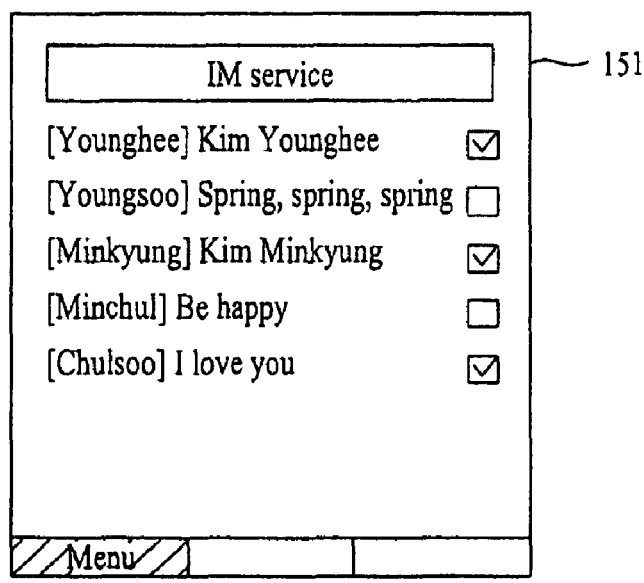

When "Other party designation" is selected from the designation target list shown in FIG. 12A, the terminal 100 displays an 'other party' list on the screen as shown in FIG. 12B. The user may select the other party, from whom the user wishes to be provided with status information, from the other party list. Accordingly, the mobile terminal 100 designates one or more of the other party selected by the user as a notification request target party or a party to be notified and receive status information related to only the selected one or more other parties. For example, in FIG. 12B, three parties are selected and the terminal 100 receives status information related to those three parties, specifically, [Younghee], [Minkyung], and [Chulsoo].

Figure 12C:
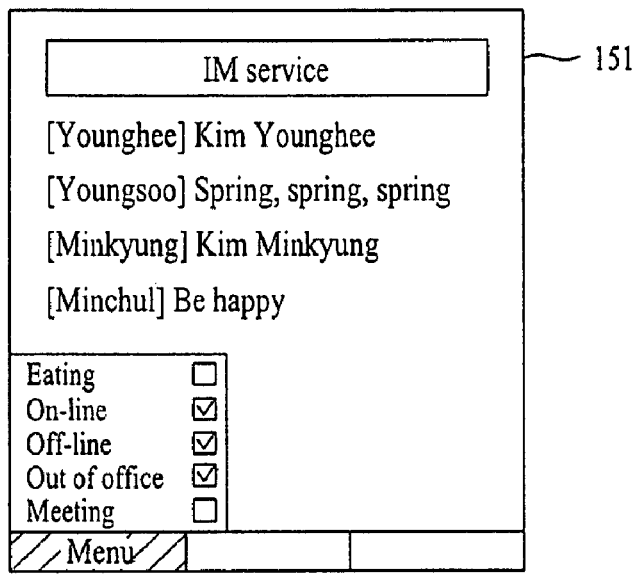

When "Status designation" is selected from the designation target list shown in FIG. 12A, the mobile terminal 100 displays a status list on the screen, as shown in FIG. 12C. The status list may include various statuses such as 'Eating,' 'On-line,' 'Off-line,' 'Out of office,' and 'Meeting.' The user may select to receive status information of the other party according to the designated status in the status list. Accordingly, the mobile terminal 100 designates the status information selected by the user as a status to be notified. For example, in FIG. 12C, three statuses 'On-line,' 'Off-line,' and 'Out of office' are selected and the mobile terminal 100 receives status information of the party whose status is only one of 'On-line,' 'Off-line,' and 'Out of office.'

Figure 12D:
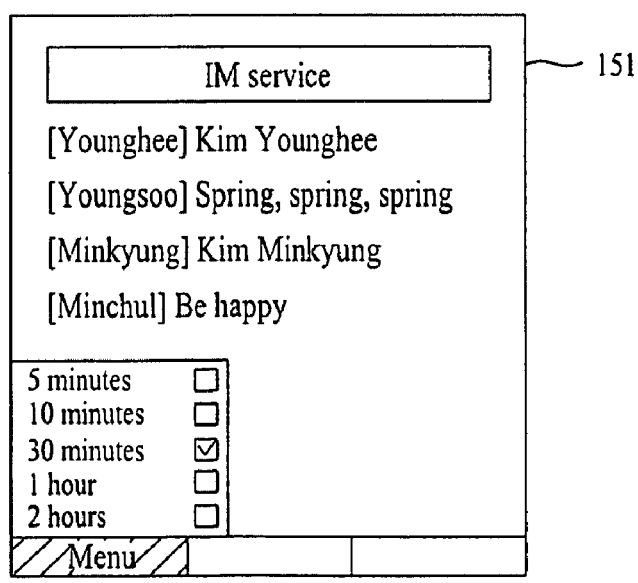

When "Period designation" is selected from the designation target list shown in FIG. 12A, the mobile terminal 100 displays a notification period list on the screen, as shown in FIG. 12D. The user may select at least one notification period from the notification period list to obtain status information of the other party according to the selected notification period.

Accordingly, the mobile terminal 100 designates the notification period selected by the user as a period to be notified and the mobile terminal receives status information of the other party only when the conditions of the other party match the selected notification period. For example, if '30 minutes' is selected from the notification period list, as shown in FIG. 12D, the user of the mobile terminal 100 will be notified of the other parties who have been in on-line status for more than or less than 30 minutes depending on a preference previously set by the user.

In addition to individually selecting the other party designation, the status designation, or the period designation according to a user's specific selection of a single designation, the mobile terminal 100 may select at least two of the 'Other party designation,' the 'Status designation,' and the 'Period designation' at the same time or cumulatively. For example, when the 'Other party designation' and the 'Status designation' are established, specific status information of a specific other party may be regarded as designation information. The designation information may include any other information to narrow the range of the status information of the other party to be notified.

Referring back to FIG. 6, the mobile terminal 100 receives the status information of the other party from the server 500 through the wireless communication unit 110, specifically, the wireless internet module 113 (S540). This step is referred to as the reception step (S540). The server 500 registers the mobile terminal 100 as the notification target terminal to transmit the status information of the other party, and therefore, when the status information of the other party is generated or changed, the server may provide the status information of the other party to the mobile terminal. Alternatively, the server 500 may periodically provide the status information of the other party to the mobile terminal 100. Furthermore, if the server 500 also registers the designation information when registering the mobile terminal 100 as the notification target terminal to transmit the status information of the other party to the mobile terminal, the status information of the other party is provided to the mobile terminal only when the designation information is also satisfied.

The terminal 100 outputs the status information of the other party received at the reception step (S540) through the output unit 150, specifically, the display 151 (S550). The status information of the other party may be output in various forms such as text, icon, emoticon, image, symbol, or voice.

Figure 13A:
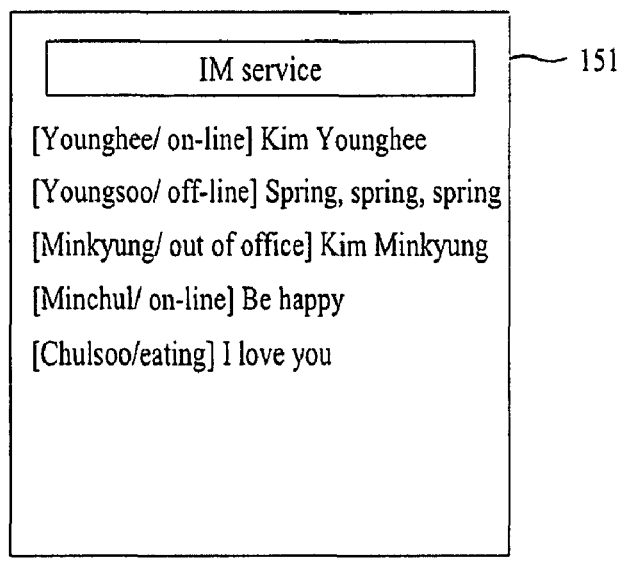
FIGS. 13A to 13C illustrate display screens for outputting status information of the other party in a mobile terminal according to an embodiment of the present invention.
Figure 13B:
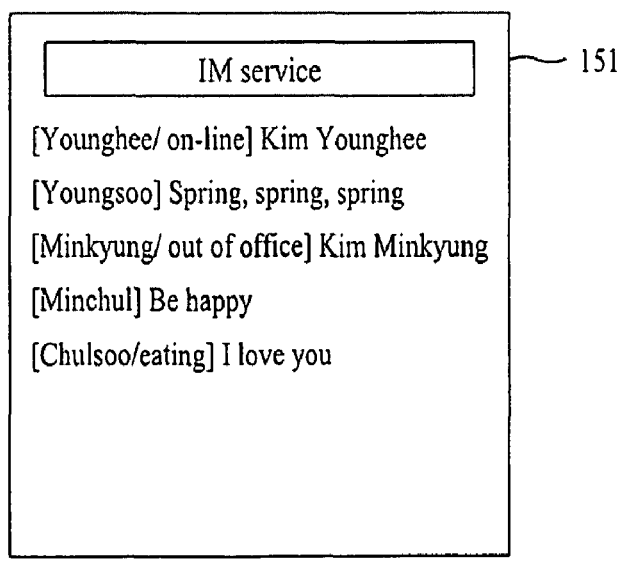

The output step (S550) will be described in more detail with reference to FIGS. 13A to 13C. As shown in FIG. 13A, the mobile terminal 100 displays status information of each individual party on the other party list. Alternatively, when parties to be notified are designated, as shown in FIG. 13B, the mobile terminal 100 may display status information of only the other parties designated as parties to be notified. For example, in FIG. 13B, since 'Younghee,' 'Minkyung,' and 'Chulsoo' have been designated as partied to be notified, only [Younghee/on-line], [Minkyung/out of office], and [Chulsoo/eating] are shown with the status information.

Figure 13C:
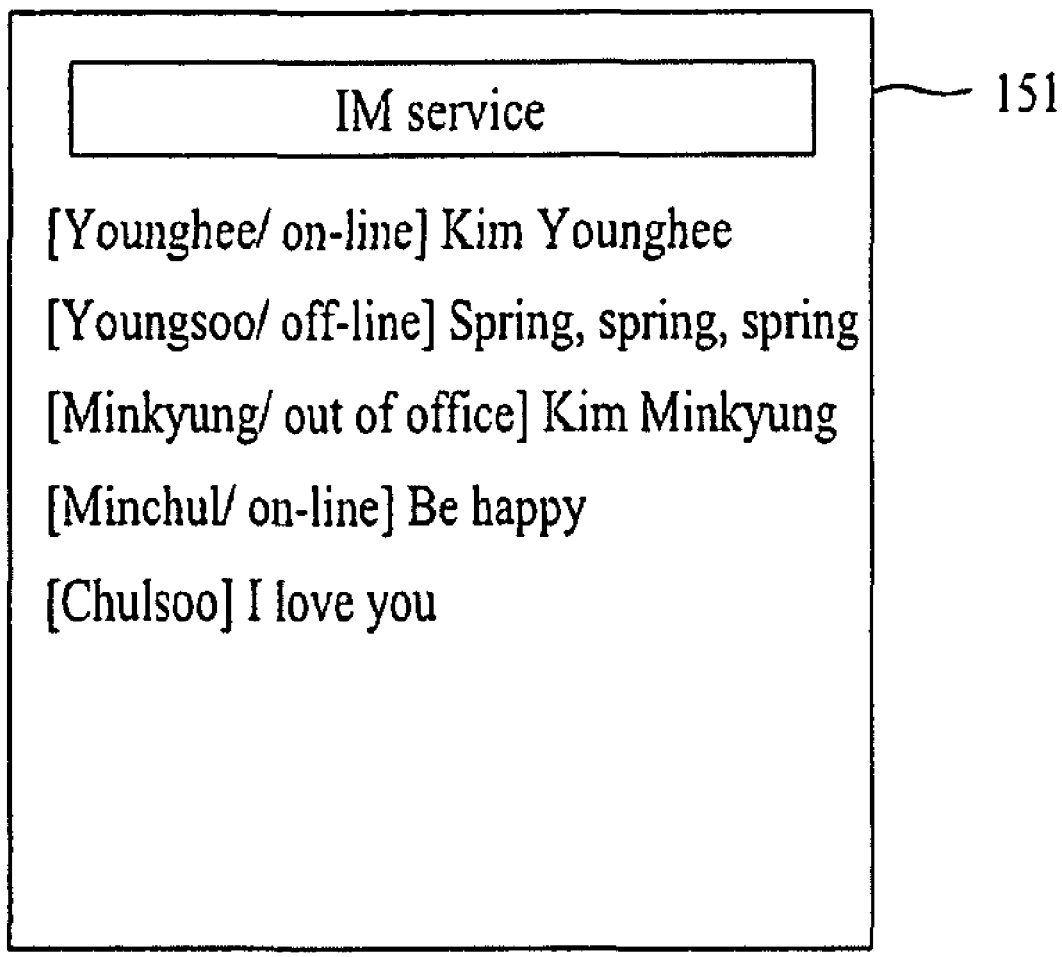

Alternatively, when status to be notified is designated, the mobile terminal 100 may display only status information designated as the status to be notified, for example, on-line, off-line, and out of office, as shown in FIG. 13C. Therefore, only [Younghee/on-line], [Youngsoo/off-line], [Minkyung/out of office], and [Minchul/on-line] are shown with the designated status to be notified.

Referring back to FIG. 6, when it is determined that an application module for the instant messaging service is inactive while the user is logged in, the mobile terminal 100 transmits a cancellation message to the server 500 to cancel the notification message previously registered with the server (S560). When the server 500 receives the cancellation message from the mobile terminal 100, the server cancels the previously registered notification message and stops transmitting the status information of the other party to the mobile terminal until the server receives another notification message from the mobile terminal.

Consequently, the mobile terminal 100 no loner receives the status information of the other party from the server, and therefore, the mobile terminal stops outputting the status information of the other party (S570). Alternatively, the mobile terminal 100 may continue to display the status information of the other party provided at the time of transmitting the cancellation message. In the present invention, the transmission and reception of a message or data between the mobile terminal 100 and the servers 500 and 600 may be performed by a session initiation protocol (SIP).

As apparent from the above description, the mobile terminal and the method of performing the instant messaging service therein according to the present invention have the following effects. First, when an application module for the instant messaging service is active, it is possible to request notification of status information regarding the other party to the server. Second, when a notification message is registered with the server to receive status information of the other party, it is possible to cancel receiving the status information from the server if an application module for the instant messaging service is inactive even if the user is logged in. Therefore, it is possible to reduce data load on a network caused by the transmission and reception or output of unnecessary status information regarding the other party, to reduce power consumption and burden of the mobile terminal.

According to an embodiment of the present invention, the mobile terminal 100 and an instant messaging service method thereof may be implemented as a code readable by a computer on a medium on which a program is recorded. Media readable by the computer include all kinds of recording devices that store data readable by a computer system. Examples of media readable by the computer include ROM, RAM, CD-ROM, a magnetic tape, a floppy disk, and an optical data storage device. Those implemented in the form of carrier wave, for example, transmission through Internet, are also included. Furthermore, the computer may include the controller 180 of the terminal 100.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of a wireless terminal executing an instant messaging service in a wireless communication system, the method comprising:
   activating the instant messaging service with a server, wherein the instant messaging service is associated with at least one user as a messenger group;
   determining whether the wireless terminal is an active status for the instant messaging service, wherein when the wireless terminal is located at an instant message service usable area, the wireless terminal is determined as the active status for the instant messaging service;
   transmitting a messenger group status activation message for the instant messaging service to the server according to the determination result;
   receiving a status data associated with the messenger group; and
   displaying information representing an updated status of the at least one user of the messenger group based on the status data.

2. The method of claim 1, wherein the messenger group status activation message is transmitted to the server when a messenger window is activated, and
   a messenger group status deactivation message is transmitted to the server when a messenger window is deactivated.

3. The method of claim 1, wherein the wireless terminal receives the status data periodically when the wireless terminal is determined as the active status for the instant messaging service.

4. The method of claim 3, wherein in the step of the determining whether the wireless terminal is an active status for the instant messaging service,
   the wireless terminal is determined as the active status for the instant messaging service, when the wireless terminal detects at least one of:
   data transmission and reception using the instant messaging service;
   an active user interface for the instant messaging service; or
   entry into an instant messaging service usable time period.

5. The method of claim 3, wherein the wireless terminal stops receiving the status data when the wireless terminal is determined as an inactive status for the instant messaging service.

6. The method of claim 5, wherein the wireless terminal is determined as the inactive status for the instant messaging service when application modules, which are not related to the instant messaging service, have been operated for more than a predetermined time.

7. The method of claim 5, further comprising:
   transmitting a messenger group status deactivation message to the server when the wireless terminal is determined as the inactive status for the instant messaging service.

8. The method of claim 6, wherein after determining the wireless terminal in the inactive status for the instant messaging service, the wireless terminal is determined as the active status for the instant messaging service when the wireless terminal detects at least one of:
   data transmission and reception using the instant messaging service;

an active user interface for the instant messaging service;
entry into an instant messaging service usable area; or
entry into an instant messaging service usable time period.

9. The method of claim 1, wherein the instant messaging service usable area is established considering at least one of usage frequency and duration of the instant messaging service performed in each area.

10. A wireless terminal comprising:
a wireless communication unit performing an instant messaging service with a server, wherein the instant messaging service is associated with at lest one user as a messenger group;
a controller configured to determine whether the wireless terminal is an active status for the instant messaging service, the controller further configured to transmit a messenger group status activation message to the server according to the determined result and receive status data associated with the messenger group, wherein when the wireless terminal is located at an instant message service usable area, the wireless terminal is determined as the active status for the instant messaging service; and
a display displaying information representing an updated status of the at least one user of the messenger group based on the status data.

11. The wireless terminal of claim 10, wherein the controller is further configured to transmit the messenger group status activation message to the server when a messenger window is activated, and configured to transmit a messenger group status deactivation message to the server when a messenger window is deactivated.

12. The wireless terminal of claim 10, wherein the wireless communication unit receives the status data periodically when the controller determines that the wireless terminal is determined as the active status for the instant messaging service.

13. The wireless terminal of claim 12, wherein the wireless terminal is determined as the active status for the instant messaging service, when the controller detects at least one of;
data transmission and reception using the instant messaging service,
an active user interface for the instant messaging service, or
entry into an instant messaging service usable time period.

14. The wireless terminal of claim 12, wherein the wireless communication unit stops receiving the status data when the controller determines that the wireless terminal is in an inactive status for the instant messaging service.

15. The wireless terminal of claim 14, wherein the controller determines that the wireless terminal is in the inactive status for the instant messaging service when application modules, which are not related to the instant messaging service, have been operated for more than a predetermined time.

16. The wireless terminal of claim 14, wherein the wireless communication unit transmits a messenger group status deactivation message to the server when the controller determines that the wireless terminal is in the inactive status for the instant messaging service.

17. The wireless terminal of claim 15, wherein after the controller determines that the wireless terminal in the inactive status for instant messaging service,
the controller determines that the wireless terminal is in the active status for the instant messaging service when the controller detects at least one of:
data transmission and reception using the instant messaging service,
an active user interface for the instant messaging service, or
entry into an instant messaging service usable time period.

18. The wireless terminal of claim 10, wherein the instant messaging service usable area is established considering at least one of usage frequency and duration of the instant messaging service performed in each.

* * * * *